United States Patent [19]

Estaque et al.

[11] Patent Number: 5,482,146
[45] Date of Patent: Jan. 9, 1996

[54] EDDY CURRENT BRAKING EQUIPMENT

[75] Inventors: Michel Estaque, Taverny; Philippe Gernot, Suresnes, both of France

[73] Assignee: Labavia - SGE, Montigny-Le-Bretonneux, France

[21] Appl. No.: 163,518

[22] Filed: Dec. 9, 1993

[30] Foreign Application Priority Data

Dec. 15, 1992 [FR] France ................................. 92 15101

[51] Int. Cl.⁶ ............................. H02P 15/00; B60L 7/28
[52] U.S. Cl. .......................... 188/164; 188/158; 310/105
[58] Field of Search ................................. 188/267, 164, 188/158, 159, 161, 162, 163, 165, 181 T; 310/105, 93; 318/765, 721, 741; 192/21.5, 4 A, 9; 303/112, 20; 364/424.1

[56] References Cited

U.S. PATENT DOCUMENTS 4,509,623 4/1985 Marandet .
5,154,623 10/1992 Kuwahara ........................... 188/164

FOREIGN PATENT DOCUMENTS 0466941 1/1992 European Pat. Off. .
2505577 11/1982 France .

OTHER PUBLICATIONS

Patent Abstract of Japan—vol. 14, N° 099 (E–893) 22 février 1990 & JP–A–13 03 100 (Toshiba Corp) 6 décembre 1989.
—abrégé—.

Primary Examiner—Douglas C. Butler
Attorney, Agent, or Firm—Larson and Taylor

[57] ABSTRACT

The equipment comprises control device that establish a power feed setting for selectively exciting the stator windings as a function of the position of a control lever while also taking the temperature of the rotor armature into account. This temperature is evaluated in real time by a processor included in the control device. At each evaluation instant, the computation variables comprise the speed of rotation of the rotor, the power feed setting, the temperature of the armature as obtained for the preceding evaluation instant, and optionally the temperature of the stator. The invention can be used to make better use of the electrical power delivered to the stator while avoiding the need to measure armature temperature directly.

7 Claims, 1 Drawing Sheet

EDDY CURRENT BRAKING EQUIPMENT

The present invention relates to eddy current equipment for braking a vehicle.

BACKGROUND OF THE INVENTION

Equipment of this type usually comprises a portion (stator) that is fixed to the chassis of the vehicle and that includes inductor windings, and a moving portion (rotor) including an armature and coupled to a rotary element of the vehicle, generally its transmission shaft.

The term "inductor winding" or more simply "winding" is used herein to cover both an inductor winding proper and a group of such windings that are permanently interconnected in series and/or parallel. Each winding as defined in this way produces a magnetic field when powered by the vehicle battery.

The armature is an element of ferromagnetic material which, when moving past excited windings, has electrical currents known as "eddy" currents induced therein. Because of the resistivity of the armature, these eddy currents cause energy to be dissipated and this results in the rotor, and thus the vehicle, being slowed down. The energy is dissipated in the form of heat, and the rotor is commonly given a finned configuration suitable for disposing of said heat.

The driver of the vehicle can actuate a multiple-position control lever to obtain a braking effect on the vehicle with a torque that varies depending on the position selected for the lever. This variability is obtained by a set of relays each serving to excite one of the windings with the number of relays in the closed-circuit position depending on the position of the lever. In a typical embodiment, there are four inductor windings and the lever has five positions corresponding respectively to 0, 1, 2, 3, and 4 of the relays being closed, with corresponding proportional braking torques being obtained.

In any given position, it is known that the braking torque tends to decrease as the temperature of the armature increases, because of variations in its resistivity and in its magnetic permeability. Beyond a certain temperature threshold, it is advantageous to limit excitation of the windings so as to avoid loss of available torque which would give rise to excessive heating. This limitation also makes it possible to achieve better management of the electrical energy resources of the vehicle.

FR-A-2 505 577 describes one way of achieving such excitation limiting. A temperature-sensitive contact is housed in a projection on a pole piece in a face of the stator adjacent to the rotor, and it is used to detect when the temperature threshold is exceeded. The contact is sensitive to the heat radiated by the armature and it is thus suitable for providing the desired temperature indication.

That type of temperature sensor is also provided by certain manufacturers who make rotors having portions that are unsuitable for withstanding large increases in temperature. This applies to a rotor having an armature made of steel which is supported on aluminum, since aluminum does not withstand temperatures greater than 300° C.

Since the rotor moves, the sensor cannot be in direct thermal contact with the armature, without using a structure that is excessively complicated. The sensor must therefore be mounted on the stator to receive the radiation given off by the armature, and this gives rise to three main problems that have not yet been solved:

random dirtying of the sensor disturbs its measuring ability by impeding its reception of radiation;

it is difficult to make the sensor substantially independent of the temperature of the stator on which it is mounted; and it is difficult to make a sensor that is relatively insensitive to heat conveyed from the rotor by air flow; unfortunately, air flow is never fully under control, particularly because of the draft produced by the fins on the rotor.

In addition, it can be difficult to install a sensor in certain models of brake.

SUMMARY OF THE INVENTION

The object of the present invention is to provide a solution to the above problems that is both simple and cheap.

Thus, the present invention provides an eddy current brake equipment for a vehicle, comprising a stator including inductor windings, a rotor adapted for mounting on a transmission shaft of the vehicle and including an armature facing the stator, a manual control member having a plurality of positions, control means for establishing a power feed setting as a function of a plurality of parameters including the position of the manual control member and the temperature of the armature, and excitation means for selectively exciting the inductor windings from an electricity source of the vehicle in response to the power feed setting, wherein the control means comprise a processor adapted to evaluate in real time the temperature of the armature at successive instants, the armature temperature at each instant in the succession being evaluated by the processor as a function of a plurality of computation variables comprising the armature temperature evaluated at the preceding instant of the succession, the speed of rotation of the rotor, and the power feed setting.

The Applicant has observed, surprisingly, that with a limited number of computation variables it is possible to take the temperature of the armature into account sufficiently accurately for the intended application of said temperature indication. Between two successive evaluation instants, the change in armature temperature depends mainly: a) on the power feed setting that governs the magnetic field generated by the stator; b) on the speed of rotation of the rotor which has an effect on the magnitude of the induced currents and on the draft produced by the motion of the rotor; and c) on the temperature of the armature, since both its resistivity and its magnetic permeability depend on temperature.

In a preferred version of the invention, the computation variables further comprise the temperature of the stator. This variable also has an influence on the temperature of the armature because of transfers of heat and above all because of its effect on the resistivity of the wire in the windings and thus on the current flowing through each excited winding and on the magnetic field it generates. By taking stator temperature into account, the processor can thus obtain a more accurate evaluation of the armature temperature.

It is possible to determine the way in which the temperature of the armature varies over a predetermined time interval as a function of the variables used for computation purposes by performing tests on the model of brake under consideration. During testing, observed temperature variations are recorded in association with various other computation variables. The recorded data can then be digitally processed to define a function that constitutes an approximation to the relationship between the armature temperature and the computation variables. The processors included in brakes of the model in question can then be programmed with this function so as to evaluate the temperature of the armature at a succession of instants that are separated by a predetermined time interval.

In a particular embodiment of the invention, the control means are arranged to change the power feed setting when the armature temperature as evaluated by the processor exceeds a predetermined threshold, and in such a manner as to cause the excitation means then to connect a number of inductor windings to the electricity power supply that is smaller than the number of windings that corresponds to the position of the manual control member. The threshold may be selected while programming the processor as a function of the particular configuration of the brake.

Nevertheless, it should be observed that the information provided by the processor represents a temperature value and not merely that a particular threshold has been exceeded. The information is therefore of a kind that is richer than the information provided by sensors fitted to known brakes, so it is thus possible to envisage implementing optimized servo-control of the power feed setting as a function of armature temperature.

BRIEF DESCRIPTION OF THE DRAWINGS

Other features and advantages of the present invention appear from the following description of a preferred and non-limiting embodiment, to be read in association with the accompanying drawing, in which.

DESCRIPTION OF A PREFERRED EMBODIMENT

Figure 1:
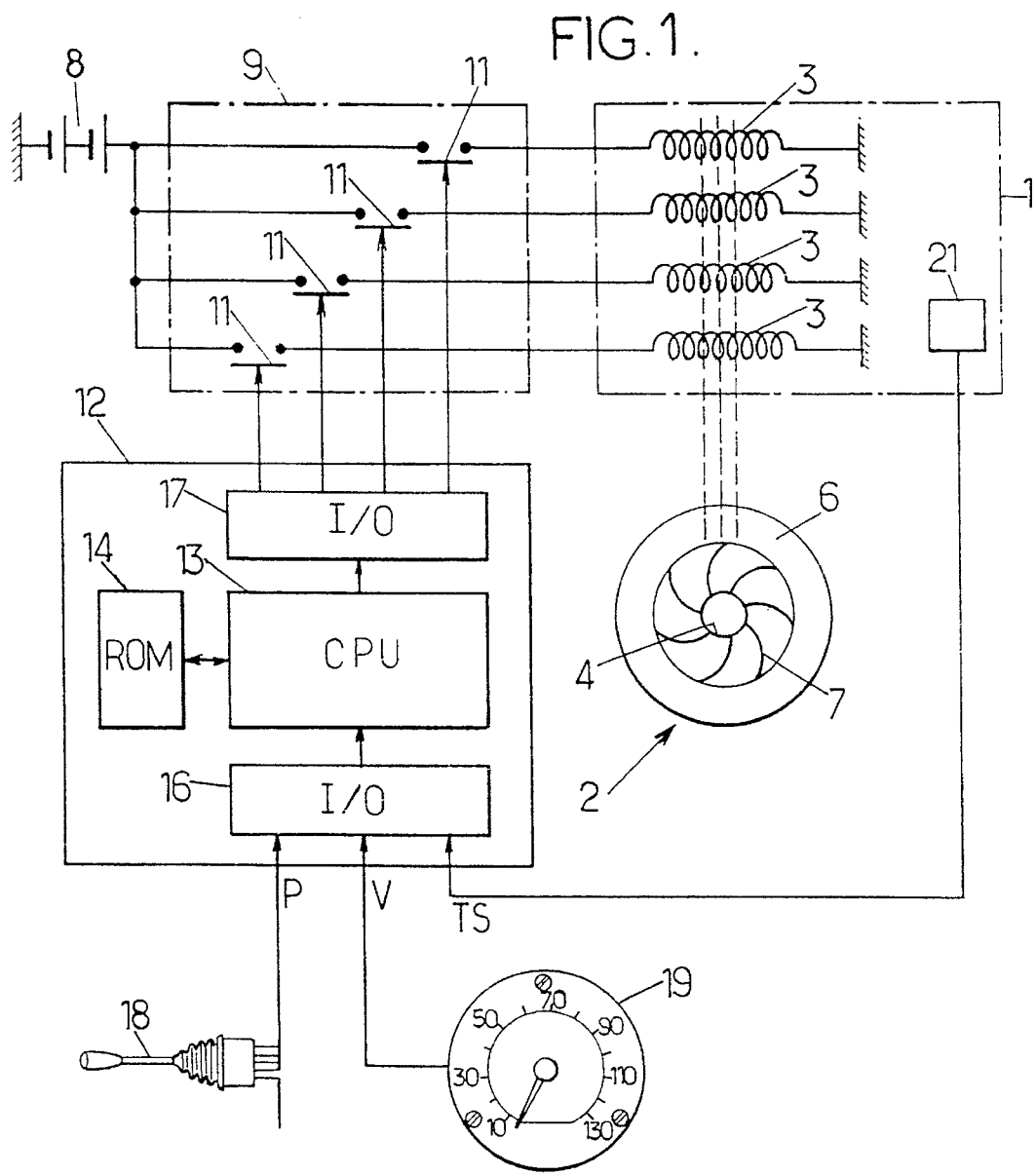
FIG. 1 is a circuit diagram of brake equipment of the invention.

With reference to FIG. 1, an eddy current brake equipment comprises in conventional manner a stator 1 and a rotor 2. The stator 1 is fixed to the chassis of the vehicle and comprises inductor windings 3, there being four such windings in the present case. Each winding 3 is constituted by a pair of coils, for example, with all eight coils being disposed about the transmission shaft (not shown) from the vehicle gear box, and having their axes parallel to said shaft. The rotor 1 is constituted by a piece of cast steel having a central bore 4 designed for mounting securely to the transmission shaft. The rotor 2 includes one or more disks perpendicular to the transmission shaft and constituting the armature 6 of the rotor. Between the armature 6 and the bore 4, each of the disks conventionally includes a finned structure 7 that provides ventilation while the transmission shaft is rotating. When the equipment is installed on a vehicle, the armature 6 is situated facing the windings 3 of the stator 1. In a typical embodiment, the rotor 2 includes one disk on either side of the stator, such that each rotating armature disk 6 faces a ring of magnetic poles as established by the windings 3 and of polarities that alternate from pole to pole. Rotation of the transmission shaft generates eddy currents in the armature 6 whenever at least one of the windings is electrically powered by the vehicle battery 8. As a result, braking torque is generated that increases with the number of windings that are excited, and simultaneously the armature heats up to an extent that is partially compensated by the ventilation from the fins 7.

The equipment includes excitation means 9 for selectively powering the windings 3 from the battery 8, which battery typically has a nominal voltage of 24 volts. The excitation means 9 are constituted by four relays 11 each mounted between the positive terminal of the battery and one end of a respective winding 3, the other end of each winding being connected to the negative terminal of the battery 8. The four relays 11 are independently controlled by four signals delivered by control means 12.

The control means 12 may be constituted by an electronic unit of the microcontroller type comprising a processor 13 associated with a memory 14 and with interface circuits 16 and 17. The input interface 16 receives various electrical signals, including:

a signal from a five-position manual control member 18 such as a lever accessible to the driver of the vehicle, which signal is representative of the position P of said member;

a signal from the tachometer 19 (represented by a dial in FIG. 1) that is associated with the transmission shaft for measuring its speed of rotation V; and a signal from a temperature sensor 21 mounted on the stator 1 and responsive to the temperature Ts of the stator in the vicinity of the rotor 2.

The control means 12 may also receive other signals for performing other functions that are not explained herein since they are not directly concerned by the invention.

The input interface 16 shapes the above-mentioned signals and applies the corresponding values to the processor 13. The processor is programmed to establish a power feed setting C on the basis of the values P, V, and Ts received by the interface 16. Depending on the setting C, the processor 13 delivers four signals via its output interface 17 for opening or closing each of the relays 11. The setting C can take one of five values: 0, 1, 2, 3, or 4, causing a corresponding number of the relays 11 to be closed, i.e. causing a corresponding number of the inductor windings 3 to be excited.

To establish the power feed setting C, account is taken of an indication relating to the temperature Tr of the armature 6, which indication, according to the invention, is constituted by an evaluation of said temperature Tr that is obtained in real time by the processor 13.

Evaluation is performed at successive instants separated by predetermined time intervals $\Delta t$ that are sufficiently small compared with the time scale on which the armature temperature is likely to vary (e.g. $\Delta t=1$ second). At each instant $t_n$ in the succession, the temperature $Tr_n$ of the armature 6 is evaluated as a function of the following computation variables:

the temperature $Tr_{n-1}$ of the armature as evaluated at the preceding instant $t_{n-1}=t_n-\Delta t$ in the succession;

the speed of rotation V of the rotor 2 as provided by the tachometer 19;

the power feed setting C whose value may be taken either at the evaluation instant $t_n$ or else at the preceding instant $t_{n-1}$; and the temperature Ts of the stator 1 as provided by the sensor 21.

The Applicant has determined that for most models of eddy current brake, the temperature of the armature can be evaluated with satisfactory accuracy by means of a polynomial function of the variables $Tr_{n-1}$, V, C and Ts, such as:

$$Tr_n = Tr_{n-1} + a.\Delta t.kp.(b.V + c.T_{n-1} + d.V.Tr_{n-1} + e.Tr^2_{n-1}f. V.Ts) \qquad (1)$$

in which:

b=+(b1+b2.C)
c=−(c1+c2.C)
d=−(d1+d2.C)
e=+(e1+e2.C)
f=−f2.C
kp=1+(kp0−1).V/3000, and a, b1, b2, c1, c2, d1, d2, e1, e2, f2, and kp0 are constant coefficients to be determined for each model, the speed V being expressed in revolutions per minute (rpm), the time interval $\Delta t$ in seconds, and the temperatures $Tr_n$, $Tr_{n-1}$, and Ts in degrees Celsius.

To determine the coefficients a, b1, b2, c1, c2, d1, d2, e1, e2, f2 and kp0, it is possible to perform tests on a prototype of the brake. A large number of situations characterized by values of the test variables under consideration are reproduced on a test bench, and variations in the temperature of the armature over the time interval $\Delta t$ are measured. Each measurement provides a value of the function that relates $Tr_n$ to variables $Tr_{n-1}$, V, C, and Ts. The set of coefficients that provide the best approximation to the measurement results using equation (1) can then be calculated, e.g. by means of a conventional least squares fit method as implemented on a computer.

A good match can be obtained in this way between equation (1) and the thermal behavior of the armature. In some cases, satisfactory matching can be obtained without including the stator temperature Ts in the computation variables, i.e. by setting f2=0. This can be explained by the fact that variations in stator temperature are mainly due to variations in the armature temperature and in the power feed setting, such that the variable Ts can sometimes be omitted by an appropriate choice for the coefficients a, b1, b2, c1, c2, d1, d2, e1, e2, and kpO.

The set of coefficients and the data applicable to evaluating the equation (1) is stored in the memory 14 of the control means 12 in each brake of the model under test. In operation, the temperature of the armature can thus be evaluated in real time by the processor 13 without there being any need for a special sensor and without suffering the drawbacks associated therewith.

To initialize the algorithm represented by equation (1) prior to putting the brake equipment into operation, it is possible, for example, to give the armature temperature a starting value $Tr_o$ equal to the measured temperature value Ts for the stator, or else to ambient temperature as provided by a thermometer.

The evaluated temperature $Tr_n$ is used to establish the power feed setting C for the time interval at following evaluation. For example, the processor 13 compares the evaluated temperature $Tr_n$ with a predetermined threshold Tmax whose value is stored in the memory 14 and is selected as a function of the particular model of brake. So long as $Tr_n$ remains less than the threshold Tmax, the setting C corresponds to the position P of the control lever 18, with the vehicle driver then actuating the lever 18 so as to set directly the number of windings that are excited, thereby obtaining a proportional amount of braking torque. When $Tr_n$ exceeds the threshold Tmax, then the processor 13 forces the power feed setting C to a value that is lower than the number which corresponds to the position of the lever 18. This limits heating of the armature 6 and also of the stator 1 and, as explained in the introduction, this makes it possible to manage the electrical resources of the vehicle better without having too great an effect on the value of the braking torque since for given excitation, said value tends to decrease with increasing temperature of the armature.

Figure 2:
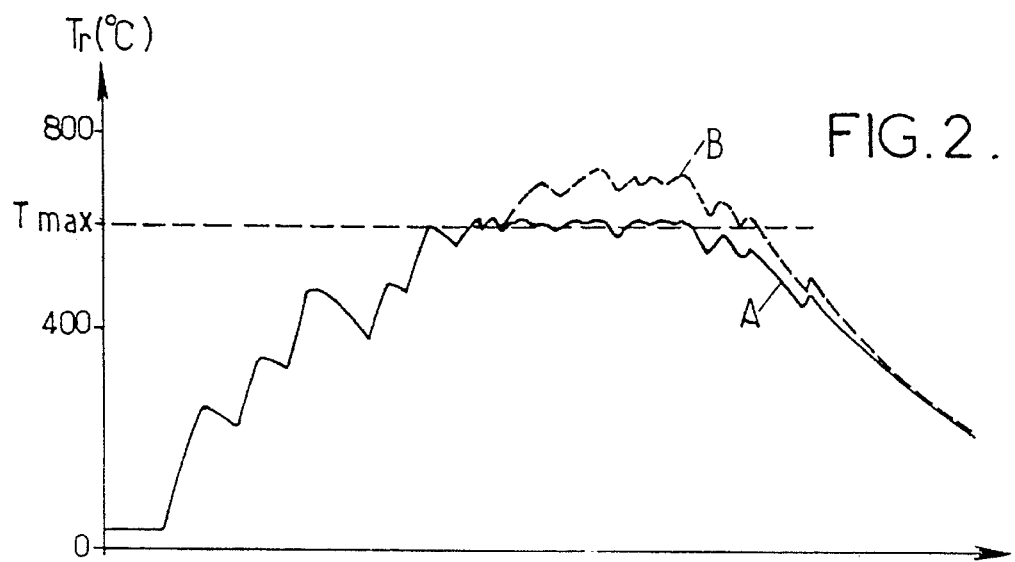
FIG. 2 is a graph showing one example of how the armature temperature may vary as a function of time in equipment of the kind shown in FIG. 1.

This behavior is illustrated by the graph of FIG. 2 in which time is plotted along the horizontal axis and represents a simulation period of about 15 minutes. Curve A shows how the temperature of the armature Tr varies for a vehicle that is travelling downhill and where the driver is making use of various different positions of the lever 18. In practice, the temperature Tr never exceeds the threshold Tmax (about 630° C. in the example shown) except by very little, since whenever the threshold is reached, the power feed setting is reduced. Dashed line curve B shows how Tr would have varied under the same conditions if the temperature indication had not been taken into account. The threshold Tmax would have been greatly exceeded and although additional braking torque would have been obtained, that would have been at the cost of a significantly greater increase in electricity consumption. The final cooling portion of both curves A and B corresponds to the brake being deactivated, i.e. to the lever 18 being put into its position P=0. During this stage, the invention makes it possible to keep to a lower temperature (curve A below curve B) such that if a new braking requirement should occur prior to the armature having cooled down to ambient temperature, then the torque immediately available for braking purposes is greater than that which would have been available if temperature had not been taken into account.

In a variant of the invention, a sensor 21 is not used for measuring stator temperature Ts. If the temperature Ts is nevertheless required as one of the variables used for computing Tr, then the processor 13 can be programmed to evaluate the temperature Ts in similar manner using an algorithm of the same type as that described above. To this end, it is possible to simply use an equation of the type:

$$Ts_n = Ts_{n-1} + (g2.Tr_{n-1} - g1).\Delta t$$

where $Ts_n$ and $Ts_{n-1}$ represent evaluated stator temperatures at instants $t_n$ and $t_{n-1}$ respectively, and where g1 and g2 are two constant coefficients to be determined experimentally as explained above for the other coefficients.

Another variant consists in determining the temperature of the stator Ts by measuring the voltage U and the current I taken by a winding 3 and calculating its resistance R=U/I therefrom. For the typical case of windings made of copper wire, resistance varies substantially as a function of temperature and can therefore be used for measuring temperature.

Although the invention is described above with reference to preferred examples, it will be understood that these examples are not limiting and that various modifications can be made thereto without going beyond the ambit of the invention.

We claim:

1. Eddy current brake equipment for a vehicle, comprising a stator including inductor windings, a rotor adapted for mounting on a transmission shaft of the vehicle and including an armature facing the stator, a manual control member having a plurality of positions, control means for establishing a power feed setting as a function of a plurality of parameters including the position of the manual control member and the temperature of the armature, and excitation means for selectively exciting the inductor windings from an electricity source of the vehicle in response to the power feed setting, wherein the control means comprise a processor adapted to evaluate in real time the temperature of the armature at successive instants, the armature temperature at each instant in the succession being evaluated by the processor as a function of a plurality of computation variables comprising the armature temperature evaluated at the preceding instant of the succession, the speed of rotation of the rotor, and the power feed setting.

2. Equipment according to claim 1, wherein said computation variables further comprise the temperature of the stator.

3. Equipment according to claim 2, further comprising means responsive to the temperature of the stator and delivering a signal to the control means representative of the stator temperature included in the computation variables.

4. Equipment according to claim 2, wherein the stator temperature included in the computation variables is evaluated by the processor at each instant of the succession as a function of the armature temperature and of the stator temperature as evaluated at the preceding instant of the succession.

5. Equipment according to claim 4, wherein the processor is arranged to evaluate the stator temperature at each instant of the succession by means of an equation of the type:

$$Ts_n = Ts_{n-1} + (g2.Tr_{n-1} - g1).\Delta t$$

in which:

g1 and g2 are constant coefficients;

$\Delta t$ designates the time interval between said instant and the preceding instant of the succession;

$Tr_{n-1}$ designates the temperature of the armature as evaluated at the preceding instant of the succession; and Tsn and $Ts_{n-1}$ designate the temperature of the stator respectively at said instant and at the preceding instant of the succession.

6. Equipment according to claim 2, wherein the processor is arranged to evaluate the armature at each instant of the succession by means of an equation of the type:

$$Tr_n = Tr_{n-1} + a.\Delta t.kp.(b.V + c.Tr_{n-1} + d.V.Tr_{n-1} + e.Tr^2_{n-1} + f.V.Ts)$$

in which:

b=+(b1+b2.C)

c=−(c1+c2.C)

d=−(d1+d2.C)

e=+(e1+e2.C)

f=−f2.C kp=1+(kp0−1).V/3000, and a, b1, b2, c1, c2, d1, d2, e1, e2, f2, and kp0 are constant coefficients;

$\Delta t$ designates the time interval separating said instant from the preceding instant of the succession;

V designates the speed of rotation of the rotor, in rpm;

C designates the power feed setting and is equal to the number of powered windings;

Ts designates the stator temperature; and $Tr_n$ and $Tr_{n-1}$ designate the armature temperature respectively at said instant and at the preceding instant of the succession.

7. Equipment according to claim 1, wherein the control means are arranged to change the power feed setting automatically whenever the armature temperature evaluated by the processor exceeds a predetermined threshold, such that the excitation means then connect the electricity source to a number of inductor windings that is less than the number which corresponds to the position of the manual control member.

* * * * *